United States Patent
Talanis et al.

(10) Patent No.: US 8,700,904 B2
(45) Date of Patent: Apr. 15, 2014

(54) METHOD FOR AUTHENTICATION IN AN AUTOMATION SYSTEM

(75) Inventors: Thomas Talanis, Heroldsbach (DE); Thomas Tröster, Dittenheim (DE); Frank Volkmann, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 2843 days.

(21) Appl. No.: 11/194,931

(22) Filed: Aug. 2, 2005

(65) Prior Publication Data

US 2006/0026436 A1 Feb. 2, 2006

(30) Foreign Application Priority Data

Aug. 2, 2004 (EP) ..................................... 04018305

(51) Int. Cl.
*H04L 9/32* (2006.01)

(52) U.S. Cl.
USPC .............................................. 713/176; 726/8

(58) Field of Classification Search
USPC .................. 709/203; 705/39; 713/176; 726/2
See application file for complete search history.

(56) References Cited

U.S. PATENT DOCUMENTS

| | | | |
|---|---|---|---|
| 6,757,828 B1 * | 6/2004 | Jaffe et al. ....................... | 713/176 |
| 2002/0138563 A1 * | 9/2002 | Trivedi ............................ | 709/203 |
| 2003/0120593 A1 * | 6/2003 | Bansal et al. ................... | 705/39 |
| 2004/0168053 A1 | 8/2004 | Kaszkin et al. | |
| 2005/0229004 A1 * | 10/2005 | Callaghan ....................... | 713/185 |
| 2005/0289639 A1 * | 12/2005 | Leung ............................. | 726/2 |
| 2007/0198840 A1 * | 8/2007 | Lee et al. ....................... | 713/176 |

FOREIGN PATENT DOCUMENTS

| | | |
|---|---|---|
| EP | 1 180 872 A1 | 2/2002 |
| EP | 1 403 749 A1 | 3/2004 |
| WO | WO 02/095506 A2 | 11/2002 |

OTHER PUBLICATIONS

Parker, T.A.; Single sign-on systems-the technologies and the ; Publication Date: May 16-18, 1995; INSPEC ; On pp. 151-155.*

* cited by examiner

*Primary Examiner* — Mohammad W Reza
*Assistant Examiner* — Monjour Rahim

(57) ABSTRACT

The invention relates to a method for planning an automation system project, a method for authenticating a user during access to an automation device in an automation system, an automation system and a computer program for planning an automation system project. To improve the security concept in automation systems, the provision of a single sign-on authentication method for an automation system is proposed. A user is thus able to simultaneously register at all automation devices within an automation project using a single authentication. A fundamental part of the invention is thus to centrally project plan the single sign-on method. In other words, the basic provision of the basis for the subsequent authentication already takes place during the project planning of the automation project based on a project database. This procedure allows the realization of a single sign-on method for the complete projected automation system and thus simultaneously for all automation devices contained in the automation system.

9 Claims, 3 Drawing Sheets

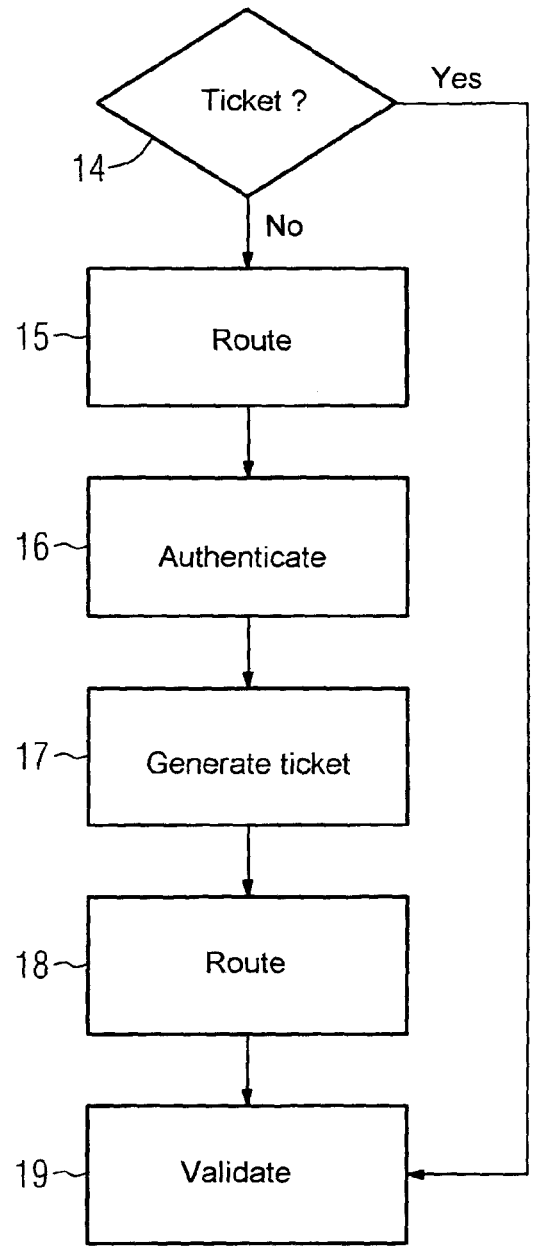

METHOD FOR AUTHENTICATION IN AN AUTOMATION SYSTEM

CROSS REFERENCE TO RELATED APPLICATIONS

This application claims priority to the European application No. 04018305.5, filed Aug. 2, 2004 and which is incorporated by reference herein in its entirety.

FIELD OF INVENTION

The invention relates to a method for planning an automation system project, a method for authenticating a user during access to an automation device in an automation system, an automation system and a computer program for planning an automation system project.

SUMMARY OF THE INVENTION

A series of factors such as the ongoing networking and unification of automation nodes and the increasing use of open communication technologies from the internet area have intensified the demand for automation-specific security concepts. An important constraint of the use of a security solution is its usability. Complex systems are thus considered as potentially insecure.

The application of a user database for each automation device within an automation system is known from the prior art. A user must reregister at each automation device. In such cases both different user identifications and also different passwords are needed. The passwords in particular are often however made easily accessible with such systems and thus represent a security risk.

The object of the present invention is to improve the security concept in automation systems. This object is achieved by the claims.

A principle concept behind the invention is to provide a single sign-on authentication method for an automation system. A user is thus able to simultaneously register at all automation devices within an automation project by means of a single authentication.

A fundamental part of the invention is thus to include a central single sign-on method in the project planning. In other words the basis for subsequent authentication is already provided during the project planning of the automation project on the basis of a project database. This procedure allows for the realization of a single sign-on method for the complete projected automation system and thus simultaneously for all automation devices contained in the automation system.

The necessary common secrets between a ticket agent determined during the project planning and the remaining automation devices are already generated during the development, with this preferably being done automatically. During the project planning, the user must only establish the user database and determine access rights.

An automation project here is taken to mean the project planning of a collection of controllers as regards programming and networking etc., with each automation project comprising a number of automation devices. An automation device here can be a programmable logic controller (PLC) for example.

The term user database refers to a type of user list, in which, in addition to the names of the user, the passwords assigned to the user and the respective rights of the user are registered. These specifications can sometimes be encrypted.

A ticket is preferably encrypted information, for example in the form of a byte sequence which describes the rights of a user. A ticket thus preferably specifies who (user), when (time or duration) where (automation device or service) has which rights. The ticket can then be validated by means of cryptographic mechanisms.

Common secrets refer to the common secrets which are needed to implement an asymmetrical encryption method.

The user of the automation system can be either a person or also a machine, for example another automation system or a programming device.

After the transmission of the project planning data into the automation devices, the single sign-on authentication takes place as follows:

After the registration of a user an initial examination is undertaken as to whether said user has a ticket. If this is the case, the ticket is validated and the access to the automation device is enabled. If the user does not have a ticket, he is routed to the ticket agent where he is requested to register himself. The routing takes place automatically on the basis of the projected data. According to the authentication of the user, the ticket agent generates a ticket for the requested service. The ticket is then preferably temporally restricted in its validity. After the ticket has been generated by means of the ticket agent, the user is routed back to the automation device. After validation of the ticket, the automation device can then be accessed.

In other words, the ticket marked by the ticket agent with its private key can be checked by any third party which has the public key assigned thereto. In other words, the examination of the signature ensures the authenticity of the ticket.

The ticket agent is preferably determined depending on the workload of the free resources for the projecting planning time. In this way, the resources can be optimally used.

An additional client software installation, for example to allow the use of cookies in an internet browser, is not necessary with the method according to the invention.

The invention allows for a particularly user friendly access to security areas in the automation technology. A one-off log-in per day or per shift can be implemented for instance.

The authentication is not only very secure in comparison with the method known from the prior art, but is also particularly simple in terms of its usability. It can also be used particularly advantageously in complex automation systems.

The method according to the invention is preferably applied in automation systems which use computer network technologies such as the internet for example. In other words, the method is suited particularly to automation systems in which automation devices (nodes) are networked with one another.

The present invention is described below in more detail with reference to an exemplary embodiment, with the aid of the figures.

BRIEF DESCRIPTION OF THE DRAWINGS

FIG. 3 shows a flow diagram describing the authentication in an automation system.

DETAILED DESCRIPTION OF THE INVENTION

Figure 1:
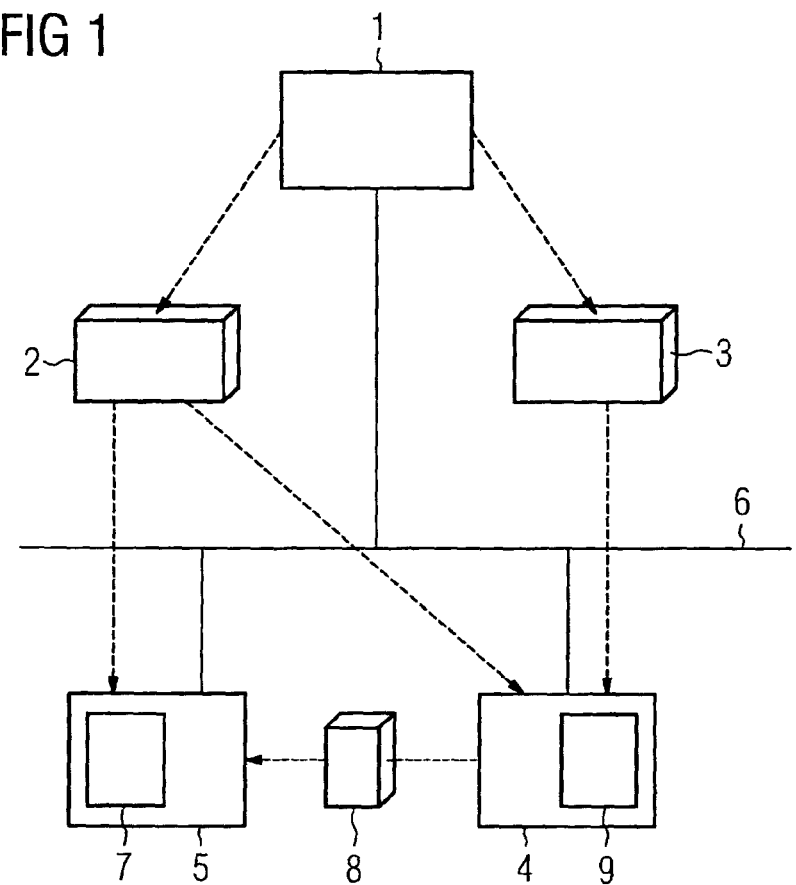
FIG. 1 shows a schematic representation of the invention.
Figure 2:
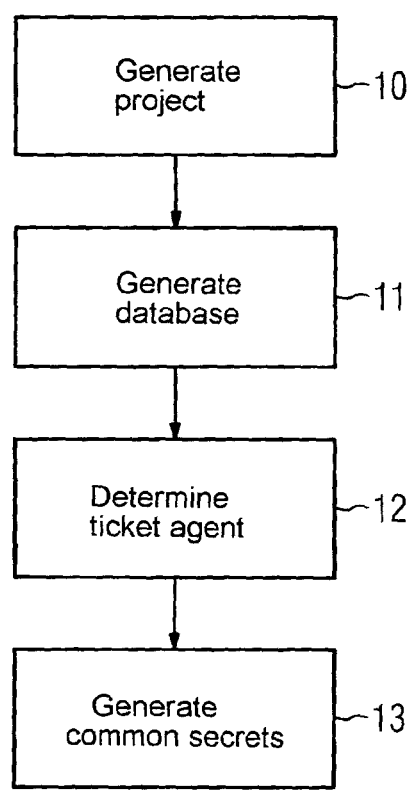
FIG. 2 shows a flow diagram describing the projecting of an automation system.

FIG. 1 displays a schematic representation of the basic setup of the hardware forming the basis of the invention. An automation system project is planned with the aid of a project planning tool 1, such that in a first step 10 the automation project 2 is generated—see FIG. 2. In a further step 11 a user database 3 is generated for the automation project 2. Furthermore, one of the automation devices 4 within the automation project 2 is determined as a ticket agent 9 (step 12). In other words, the automation device 4 thus comprises the functionality of a ticket agent 9. Finally the common secrets for the subsequent communication between the ticket agents 9 and the remaining automation devices 5 of the automation project 2 are automatically generated (step 13). The project planning tool 1 is preferably implemented as a computer program. A step 7 automation tool can be used for projecting purposes.

After the automation project 2 has been generated, it is transmitted by means of known techniques via a computer network 6, for example the internet, from the project planning tool 1 into the individual automation devices 4, 5 of the automation system. The user database 3 is transmitted there by means of the automation device 4 determined by the projecting as a ticket agent 9. These transmissions are shown in FIG. 1 with a dashed line.

If a user, a service technician for example, accesses one of the automation devices 5, an examination is carried out by an authentication module 7 of the automation device in a first step 14, as to whether the user has a ticket, see FIG. 3. If this is not the case, the user is automatically routed to the ticket agent 9 within the automation system, by means of HTTP redirect for example. In a next step 16, this authenticates the user based on the user database 3 and automatically generates in step 17 a ticket 8 for access to the automation device 5. Subsequently the ticket agent 9 routes the user back to the automation device 5, where it was originally accessed (step routing 18). The ticket 8 (validation step 19) is validated by means of the authentication module 8. User access to the automation device 5 and/or the intended service is finally approved as a function of the result of the validation.

Provided the user already has a valid ticket 8, he is not forwarded to the ticket agent 9 with an access to the automation device 5. An immediate validation through the authentication module 7 takes place instead. If this ticket 8 issued by the ticket agent 9 on the morning of the a user's working day is valid for 8 hours for example, the user can access the automation device 5 using the already issued ticket as often as necessary within this time without requiring a renewed authentication.

With the implementation of the present invention, the following techniques are preferably used in addition to the automatic redirection of the authentication: Cerberus, Passport, Digest Authentication and Hashing.

In summary, the invention thus relates to a method for planning an automation system project, a method for authenticating a user during access to an automation device in an automation system, an automation system and a computer program for planning an automation system project. To improve the security concept in automation systems it is proposed to provide a single sign-on authentication method for an automation system. A user is thus able to simultaneously register at all automation devices with an automation project by means of a single authentication. A fundamental part of the invention is thus to centrally project the single sign-on method. In other words, the basic provision of the basics for the subsequent authentication already takes place during the planning of the automation project based on a project database. This procedure allows for the realization of a single sign-on-method for the complete projected automation system and thus at the same time for all the automation devices contained in the automation system.

The invention further advantageously comprises a computer program for project planning an automation system
   with computer program commands for generating (10) an automation project (2),
   with computer program commands for generating (11) a user database (3) for the automation project (2),
   with computer program commands for determining (12) an automation device (4) within the automation project (2) as a ticket agent (9) and
   with computer program commands for automatically generating (13) common secrets for the communication between the ticket agents (9), and the automation devices (5) of the automation project (2).

The invention claimed is:

1. A method for project planning an automation system, comprising:
generating an automation project including provision of a plurality of controllers and automation devices, wherein the automation devices include one or more programmable logic controllers;
generating a user database for the automation project;
designating one of the automation devices within the automation project as a ticket agent; and
automatically generating common secrets for the communication between the ticket agent and automation devices of the automation project;
upon an effort by a user to access one of the automation devices, performing a determination with an authentication module as to whether the user has a valid ticket; and
if the authentication module validates a ticket for the user, then permitting the user repeated access to the one automation device during a predetermined time period without requiring renewed validation of the ticket or authentication of the user each time the user again accesses the one automation device during the predetermined time period.

2. The method according to claim 1, further comprising:
assigning the user database to the ticket agent.

3. The method according to claim 1, further comprising:
automatically disclosing an address of the ticket agent to all automation devices.

4. The method according to claim 2, further comprising:
automatically disclosing an address of the ticket agent to all automation devices.

5. A method for authenticating a user during access to an automation device in an automation system which was planned according to a method comprising the following steps:
generating an automation project including a plurality of controllers and automation devices, wherein the automation devices include one or more programmable logic controllers;
generating a user database for the automation project;
designating one of the automation devices within the automation project as a ticket agent; and
automatically generating common secrets for the communication between the ticket agent and automation devices of the automation project, the method for authenticating comprising:
upon an effort by the user to access one of the automation devices, performing a determination with an authentication module as to whether the user has a valid ticket;
if the user has no ticket: authenticating the user by the ticket agent based on the user database, generating a ticket for the access to the one automation device by the ticket agent, and forwarding the user access to the automation device by the ticket agent; and if the user has a ticket: validating the ticket by the one automation device and allowing the access as a function of the validation result; and if the ticket is validated, then permitting the user repeated access to the one automation device during a predetermined time period without requiring renewed validation of the ticket or authentication of the user each time the user again accesses the one automation device during the predetermined time period.

6. The method according to claim 5, further comprising: automatically routing the user access through the automation device to the ticket agent.

7. The method according to claim 5, wherein the ticket is valid in a temporally restricted manner.

8. The method according to claim 6, wherein the ticket is valid in a temporally restricted manner.

9. An automation system, comprising:

a plurality of controllers and automation devices, wherein the automation devices include one or more programmable logic controllers;

a user database identifying authorized users with respect to individual automation devices and passwords assigned to the users, at least one first automation device comprising an authentication module for examining whether a user has a ticket describing the access rights of the user with respect to the automation devices and for automatically routing a user access to a ticket agent, if the user has no ticket, and for validating the ticket by the first automation device and allowing the access as a function of the validation result, if the user has a ticket; and a second of the automation devices operating as the ticket agent for authenticating the user based on a user database, for generating a ticket for the access to the automation device, and for routing the user access to the first automation device, wherein when a ticket is validated for the user with respect to at least one of the automation devices, the system permits the user repeated access to the one automation device during a predetermined time period without requiring renewed validation of the ticket or authentication of the user each time the user again accesses the at least one automation device during the predetermined time period.

\* \* \* \* \*